Oct. 27, 1931.  W. H. WELCH  1,829,426
DEVICE FOR USE WHEN TESTING OR ADJUSTING BRAKES
Filed June 21, 1929
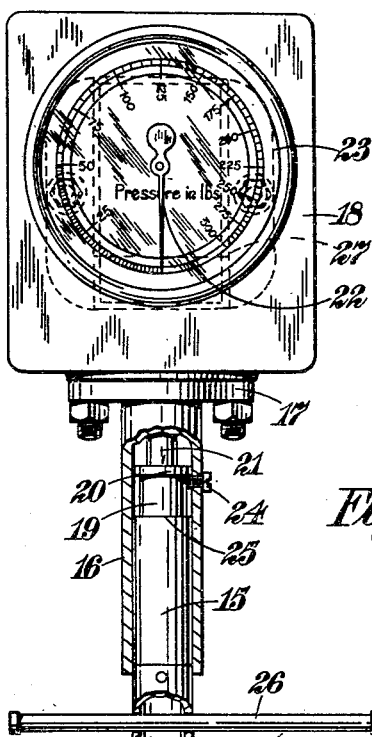
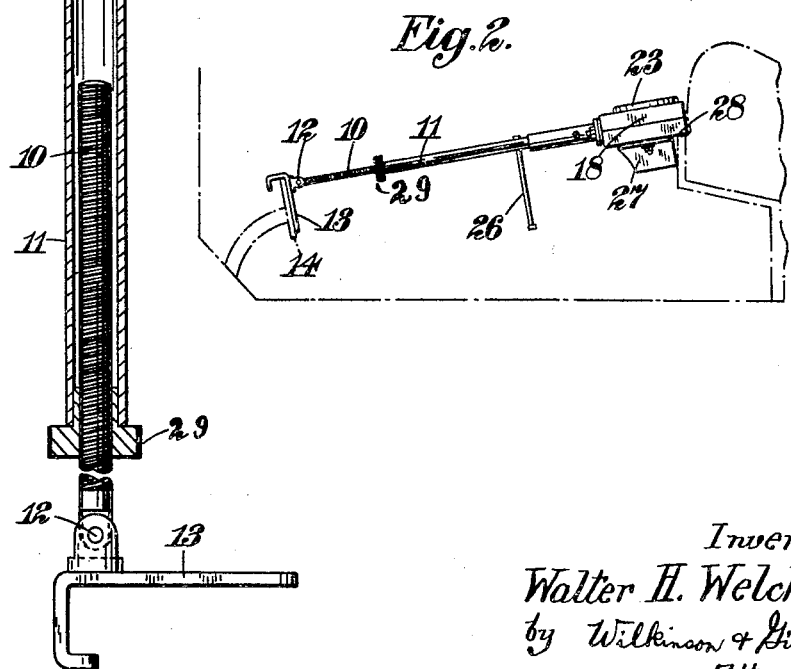
Inventor
Walter H. Welch
by Wilkinson & Giusta
Attorneys.

Patented Oct. 27, 1931

1,829,426

UNITED STATES PATENT OFFICE

WALTER HENRY WELCH, OF BRISTOL, ENGLAND

DEVICE FOR USE WHEN TESTING OR ADJUSTING BRAKES

Application filed June 21, 1929, Serial No. 372,712, and in Great Britain July 4, 1928.

When testing or adjusting the brakes of a motor vehicle it is desirable to know the pressure or other force applied to the brake-actuating lever as otherwise any test results obtained may be entirely misleading. In actual practice the pressure or other force which can be exerted on said lever depends to some extent on the strength of the driver and the position of the lever relatively to the driver's seat. Therefore, in order to obtain the best results it is necessary to know within reasonable limits the maximum force which can be applied by the person who usually drives the vehicle and to apply approximately the same force when testing or adjusting the brakes. It is an object of this invention to provide a device whereby any selected force can be applied to the brake-actuating lever.

According to the present invention, there is provided in a device for the purpose set forth, comprising two relatively movable members whereof one can be operatively connected with (e. g. bear against) a fixed abutment, and the other operatively connected with a movable element of the brake-actuating mechanism (e. g. the brake-pedal), and means for moving said members relatively to each other so as to apply the brakes, the provision of means for measuring the force which is thus applied to the said movable element. This measuring means may include a spring or a chamber having a flexible wall and containing a fluid (e. g. oil or air) for actuating a pressure gauge.

Conveniently, one of the relatively movable members comprises two parts that are capable of relative movement under the reaction of the force applied, and a pressure gauge is provided for measuring the force applied.

For a more complete understanding of the invention one embodiment thereof will now be described with reference to the accompanying drawings in which—

Figure 1 is an elevation partly in section of the device, and

Figure 2 is a view showing the position of the device when in operation.

The device comprises two relatively movable members that are telescopically arranged, namely a screw-threaded rod 10 and a tube 11 rotatably mounted on said rod by the aid of a nut-like member 29 on said tube. One end of the screw-threaded rod 10 is pivotally connected at 12 to a bracket 13 which can be held against or secured to a brake-pedal 14. Fixed in the end of the tube 11 remote from the aforesaid pivotal connection is a rod 15 which is rotatably and slidably mounted within a sleeve 16 having a flange 17 whereby it is secured to a two-part casing 18 containing a spring, or other force responsive device, coupled to an indicating dial, and the necessary appurtenant parts. The rod 15 has a portion 19 of reduced diameter and a head 20 which bears against the end of a slidably mounted rod 21 that is operatively connected to the pointer 22 of a pressure gauge 23. A screw 24 in the sleeve 16 projects into the space between said sleeve and the reduced portion 19 of the rod 15 and constitutes a stop for the head 20 and the shoulder 25 on the rod 15 formed by the reduced portion 19 thereof. The length of said reduced portion is sufficient to permit the pointer to move from zero to the highest marking on the dial of the pressure gauge. A tommy bar 26 is mounted in the tube 11 for turning the latter. In some cases it may be inconvenient to use this tommy-bar; the tube 11 can then be turned by means of the nut-like member 29 which is knurled as shown for this purpose. At the back of the two-part casing 18 a block or the equivalent 27 (e. g. a hollow casing) is provided, which block bears against the front face of the driver's seat when the casing 18 is resting thereon as shown in Figure 2. If the said seat is upholstered or otherwise constructed in such a manner that a convenient ledge such as 28 in Figure 2 is not available for supporting the casing 18, a wooden block or other suitable support may be placed on the floor of the vehicle in front of the driver's seat.

It will be appreciated that the operation of the device is as follows:—

The rod 10 is screwed out of the tube 11 so that the bracket 13 can rest on the pedal 14 and the casing 18 be supported on the ledge 28 of the driver's seat, or other fixed abutment. The tube 11 is then further rotated so as to depress the pedal and apply the brakes. When the brakes are applied, continued rotation of the tube 11 causes it to travel along the screw-threaded rod 10 and the head 20 to press against the rod 21 so as to move the latter axially and thus actuate the pressure gauge. By this means the force exerted on the brake-pedal is indicated on the dial of the pressure gauge. Thus, it will be seen that any selected pressure can be applied to the brake-pedal as it is only necessary to rotate the tube 11 until the desired pressure is indicated on the dial. The brakes can then be tested or adjusted accordingly.

Hitherto when testing or adjusting brakes, it has been necessary either to use a brake applying tool for holding the brake pedal in a depressed position, or for someone to sit in the driver's seat and depress the pedal while the tests or other operations are being carried out. The known brake applying tools permit the amount of depression of the pedal to be varied but do not embody any means for indicating the pressure exerted. The depression of the pedal by someone sitting on the driver's seat is also not satisfactory even if a pressure pad is mounted on the pedal and operatively connected to a pressure gauge, because the pressure exerted on the pedal or pad varies from time to time, and, consequently, only imperfect comparisons are made. By the aid of the present invention, it is possible to apply any selected pressure with certainty whenever required, and, consequently, much more satisfactory tests can be made and the brakes can be adjusted so as to obtain the best possible results for varying conditions.

The invention is not restricted to the precise constructional details described, as various changes can be made, more particularly with regard to the measuring and indicating devices, which may be actuated by spring or fluid pressure, as may be most convenient. Also, if desired, provision may be made whereby the device can be quickly and approximately set to suit different distances between the brake pedal and the driver's seat or other fixed abutment, for instance a rack and pinion or pawl and ratchet mechanism may be provided for this purpose, and then finely adjusted for applying the brake and measuring the force applied.

I claim—

A device for the purpose set forth, comprising in combination a bracket arranged for engagement with a brake-pedal, an externally screw-threaded rod pivotally connected to said bracket, a rotatable tube, a nut-member connected to the said tube to turn therewith and having screw-threaded engagement with the said rod, a sleeve on the end of said tube remote from the aforesaid pivotal connection, which tube is rotatably and slidably mounted in said sleeve, means for limiting for the purpose set forth, the endwise movement of said tube in the sleeve, a force-responsive device to indicate force applied thereto, and a part operatively connected to the force-responsive device and arranged to be actuated by the endwise movement of the tube aforesaid.

In testimony whereof I affix my signature.

WALTER HENRY WELCH.